US010210069B2

(12) United States Patent
Santhanam et al.

(10) Patent No.: US 10,210,069 B2
(45) Date of Patent: Feb. 19, 2019

(54) REAL-TIME HIERARCHICAL PROTOCOL DECODING

(71) Applicant: Total Phase, Inc., Santa Clara, CA (US)

(72) Inventors: Kumaran Santhanam, Sunnyvale, CA (US); Leonid Vaynberg, Sunnyvale, CA (US)

(73) Assignee: Total Phase, Inc., Santa Clara, CA (US)

( * ) Notice: Subject to any disclaimer, the term of this patent is extended or adjusted under 35 U.S.C. 154(b) by 445 days.

(21) Appl. No.: 14/841,130

(22) Filed: Aug. 31, 2015

(65) Prior Publication Data

US 2016/0117234 A1 Apr. 28, 2016

Related U.S. Application Data

(63) Continuation of application No. 14/547,040, filed on Nov. 18, 2014, now Pat. No. 9,154,389, which is a
(Continued)

(51) Int. Cl.
| | |
|---|---|
| *G06F 11/32* | (2006.01) |
| *G06F 11/30* | (2006.01) |
| *G06F 11/07* | (2006.01) |
| *G06F 11/22* | (2006.01) |
| *H04L 12/26* | (2006.01) |
| *G06F 5/14* | (2006.01) |

(52) U.S. Cl.
CPC .............. *G06F 11/327* (2013.01); *G06F 5/14* (2013.01); *G06F 11/0745* (2013.01); *G06F 11/0757* (2013.01); *G06F 11/221* (2013.01); *G06F 11/3027* (2013.01); *G06F 11/3041* (2013.01); *G06F 11/3048* (2013.01); *G06F 11/3093* (2013.01); *H04L 43/045* (2013.01); *H04L 43/10* (2013.01); *G06F 2205/062* (2013.01)

(58) Field of Classification Search
None
See application file for complete search history.

(56) References Cited

U.S. PATENT DOCUMENTS

| | | | | |
|---|---|---|---|---|
| 5,724,599 A | * | 3/1998 | Balmer | ................... G06F 15/16 |
| | | | | 710/260 |
| 6,584,501 B1 | * | 6/2003 | Cartsonis | ................ H04L 41/22 |
| | | | | 370/233 |

(Continued)

OTHER PUBLICATIONS

"How to do File Based Decoding for USB". CATC. Published Dec. 1, 2003. Available at: http://cdn.teledynelecroy.com/files/appnotes/usb_fileaseddecodes.pdf.*
(Continued)

*Primary Examiner* — Michael Sun
(74) *Attorney, Agent, or Firm* — Van Pelt, Yi & James LLP

(57) ABSTRACT

Real-time USB class level decoding is disclosed. In some embodiments, a first packet associated with a USB class level operation associated with a target USB device that is being monitored is received. A second packet generated by a USB hardware analyzer configured to observe USB traffic associated with the target USB device is received. It is determined based at least in part on a time associated with one or both of the first packet and the second packet that the class level operation has timed out.

18 Claims, 22 Drawing Sheets

Related U.S. Application Data continuation of application No. 13/656,616, filed on Oct. 19, 2012, now Pat. No. 8,918,550, which is a continuation-in-part of application No. 12/870,759, filed on Aug. 27, 2010, now Pat. No. 8,321,604.

(56) References Cited

U.S. PATENT DOCUMENTS

| | | | | |
|---|---|---|---|---|
| 7,117,504 B2* | 10/2006 | Smith | ............. | G06F 8/20 719/328 |
| 7,395,349 B1* | 7/2008 | Szabo | ............. | H04L 12/4641 709/238 |
| 7,493,431 B2* | 2/2009 | McLeod | ............. | G06F 13/4013 710/63 |
| 7,734,713 B2* | 6/2010 | Gray | ............. | G06F 3/0607 709/213 |
| 2002/0174082 A1* | 11/2002 | Miloushev | ............. | G06Q 40/00 706/15 |
| 2003/0078960 A1* | 4/2003 | Murren | ............. | H04L 29/06 709/203 |
| 2004/0148333 A1* | 7/2004 | Manion | ............. | H04L 63/104 709/201 |
| 2007/0244987 A1* | 10/2007 | Pedersen | ............. | H04L 63/0272 709/217 |
| 2008/0082736 A1* | 4/2008 | Chow | ............. | G06F 12/0246 711/103 |
| 2011/0276611 A1* | 11/2011 | Verma | ............. | G06F 17/30227 707/826 |
| 2012/0236015 A1* | 9/2012 | Song | ............. | G09G 5/001 345/531 |
| 2013/0117239 A1* | 5/2013 | Hasegawa | ............. | G06F 17/30091 707/687 |

OTHER PUBLICATIONS

"LeCroy USB Protocol Suite User Manual version 4.3". LeCroy Protocol Solutions Group. Published Sep. 2011. Available at: http://cdn.teledynelecroy.com/files/manuals/usbprotocolsuiteusermanual_v4.30.pdf.*

* cited by examiner

800

802    804

| Read | LBA=18962 Length=8 blocks (Passed) |
| --- | --- |
| [+] Command Transport | |
| [-] Data Transport | 00 00 00 00 00 00 00 00 00 |
| [-] IN txn | 00 00 00 00 00 00 00 00 00 |
| IN packet | 69 B7 B0 |
| DATA1 packet | 4B 00 00 00 00 00 00 00 00 |
| ACK packet | D2 |
| [+] IN txn | 00 00 00 00 00 00 00 00 00 |
| ⋮ | |
| [+] Status Transport | Passed |

| | |
|---|---|
| ⊞ Read | LBA=18896 L=16 blocks (Passed) |
| ⊞ [93 SOF] | [Frames 1845.6-1857.2] |
| ⊞ Read | LBA=18912 L=240 blocks (Passed) |
| ⊞ [9 SOF] | [Frames 1857.3-1858.3] |
| ⊟ Read | LBA=18962 L=8 blocks (Passed) |
|   ⊞ Command Transport | |
|   ⊟ Data Transport | 00 00 00 00 00 00 00 00 00 |
|     ⊟ IN txn | 00 00 00 00 00 00 00 00 00 |
|       IN packet | 69 B7 B0 |
|       DATA1 packet | 4B 00 00 00 00 00 00 00 00 |
|       ACK packet | D2 |
|     ⊞ IN txn | 00 00 00 00 00 00 00 00 00 |
|     ⋮ | |
|   ⊞ Status Transport | Passed |

FIG. 16

REAL-TIME HIERARCHICAL PROTOCOL DECODING

CROSS REFERENCE TO OTHER APPLICATIONS

This application is a continuation of co-pending U.S. patent application Ser. No. 14/547,040, entitled REAL-TIME HIERARCHICAL PROTOCOL DECODING, filed Nov. 18, 2014, which is a continuation of U.S. patent application Ser. No. 13/656,616, now U.S. Pat. No. 8,918,550, entitled REAL-TIME USB CLASS LEVEL DECODING, filed Oct. 19, 2012, which is a continuation in part of U.S. patent application Ser. No. 12/870,759, now U.S. Pat. No. 8,321,604, entitled REAL-TIME USB CLASS LEVEL DECODING, filed Aug. 27, 2010, all of which are incorporated herein by reference for all purposes.

BACKGROUND OF THE INVENTION

Universal Serial Bus (USB) analyzers are used by manufacturers and other developers of USB devices, software (e.g., drivers), firmware, etc. to monitor and analyze communications on the Universal Serial Bus (USB). For example, communications between a target USB devices and a target host to which the device has been connected via a USB port on the target host may be monitored to ensure the device is communicating properly with the target host and vice versa in accordance with applicable USB standards and protocols.

A hardware USB analyzer typically comprises a stand alone or other hardware device having a first set of connectors to enable the analyzer to be connected so as to be able to observe traffic between a target USB device and a target host; hardware and/or firmware to decode signals observed on the USB connection being monitored into USB packets; and hardware, logic, and/or an external connector to enable the analyzer to be connected to an analysis PC and to forward to the analysis PC.

The USB base specifications define protocols that govern communication on the USB bus. Device class codes are defined to enable a USB device to identify itself as being a member of one or more classes of device, for example by including associated USB class code and/or device descriptor information in the "enumeration" information the device communicates to the host upon initial connection. Device classes may have one or more level of subclass, and each of these may have one or more different protocols associated with it. For each USB device class, a class specification defines class-specific protocols. In this way, for example, a USB driver developed independently of a USB device should be usable with the device so long as each conforms to the same class and/or device-specific protocols defined in applicable USB specifications.

BRIEF DESCRIPTION OF THE DRAWINGS

Various embodiments of the invention are disclosed in the following detailed description and the accompanying drawings.

FIG. 8 is a block diagram illustrating an embodiment of a display of monitored USB data decoded to a class level.

FIG. 16 is a block diagram illustrating an embodiment of a class level view.

DETAILED DESCRIPTION

Figure 1:
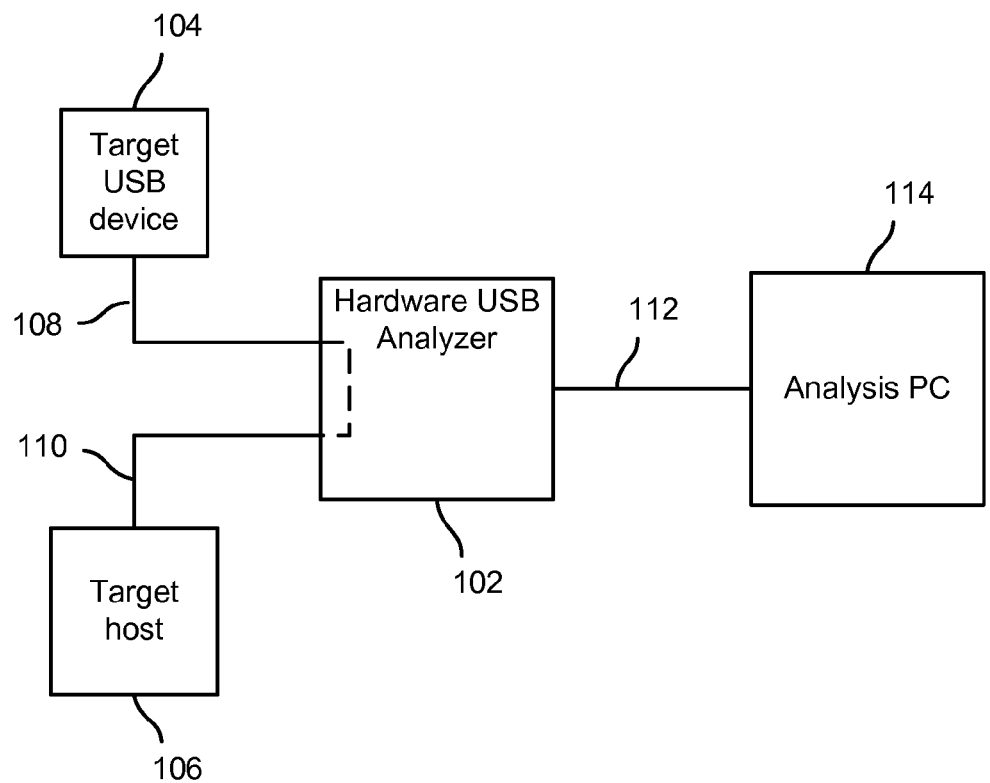
FIG. 1 is a block diagram illustrating an embodiment of a hardware USB analyzer.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Real-time USB class level decoding is disclosed. In various embodiments, a hardware USB analyzer is configured to receive and monitor USB communications, e.g., between a target USB device and an associated target host. The analyzer provides an analysis stream, e.g., comprising USB packets observed being sent between the target device and the target host, to an analysis personal computer (PC) or other analysis computer. The analysis PC runs analysis software configured to enable the PC to decode the monitored USB traffic to the class level, and to display to a user via a display device class level information, such as class level instructions and commands sent between the target device and the target host. In some embodiments, if the analyzer has not observed a packet within a prescribed time, the analyzer outputs a periodic "no activity" packet or other report to the analysis PC. The analysis software running on the PC uses a timestamp or other time associated with the "no activity" packet, and the time of the last observed packet between the target device and the target host, along with an awareness of a class level state (e.g., a pending and not yet completed class level interaction, such a "read" from a "mass storage" device), to detect and report timeouts in an efficient and timely manner.

In some embodiments, the analyzer stores monitored packets in a circular buffer as they are received. Once the buffer is full older packets are overwritten as new packets are received and decoded. Upon receiving a "capture" command or other indication the contents of the buffer are provided to the analysis PC in a "capture" stream. In some embodiments, as packets are received at the analyzer the analyzer determines whether they are associated with an initial enumeration of the device and/or post-enumeration information such as device descriptor data. Such information is required to be known and used in some embodiments to enable class level decoding; however, a "capture" may be started (relatively) long after enumeration information has been received. In some embodiments, enumeration records are copied and indexed, e.g., prior to being overwritten, to ensure they (or associated information derived from same) will be available for use at a later time to enable class level decoding of a subsequently "captured" stream.

In some embodiments, the analysis software is configured to display information in a way such that packets that are likely not of interest to the user will not be displayed in a way that prevents the user from seeing, for example in a reasonable compact and/or concurrently viewable display area, a sequence of related packets that are of interest. Example of packets that may not be of interest are successive "start of frame" (SOF) packets sent periodically to mark the start of a new frame and exchanges between a target host and a target device of successive pairs of "IN" and "NAK" packets, i.e., packets exchanged as the host periodically polls the device for data during a period of time during which for whatever reason the device has no data to send to the host. In various embodiments, the manner in which such packets not particularly of interest are grouped and displayed may vary depending on whether a class level view or a transaction level view has been selected.

FIG. 1 is a block diagram illustrating an embodiment of a hardware USB analyzer. In the example shown, USB analyzer 102 is configured to monitor a USB connection between a target USB device 104 and a target host 106. A first USB cable/connector 108 connects the target USB device 104 to the analyzer 102; and a second USB cable/connector 110 connects the analyzer 102 to the target host 106. Examples of target USB devices include without limitation a printer, a mass storage device, and a human interface device (HID) such as a mouse or keyboard. Connected in the way shown in FIG. 1, the analyzer 102 receives USB bus signals communicated either by the target USB device to the target host or by the target host to the target device, enable the analyzer to monitor the bidirectional communications. Typically the analyzer is configured to listen passively, such that the target host and target device believe they have a direct USB connection between them. The analyzer 102 provides an analysis stream via an analysis stream output connection 112 to an analysis PC (or other computer) 114. In some embodiments the connection 112 is itself a USB connection between the analyzer 102 and the analysis PC 114. In various embodiments, the analysis PC 114 and target host 106 may comprises the same physical system, e.g., a PC to which the device 104 has been connected via the analyzer 102 and connections 108 and 110.

Figure 2:
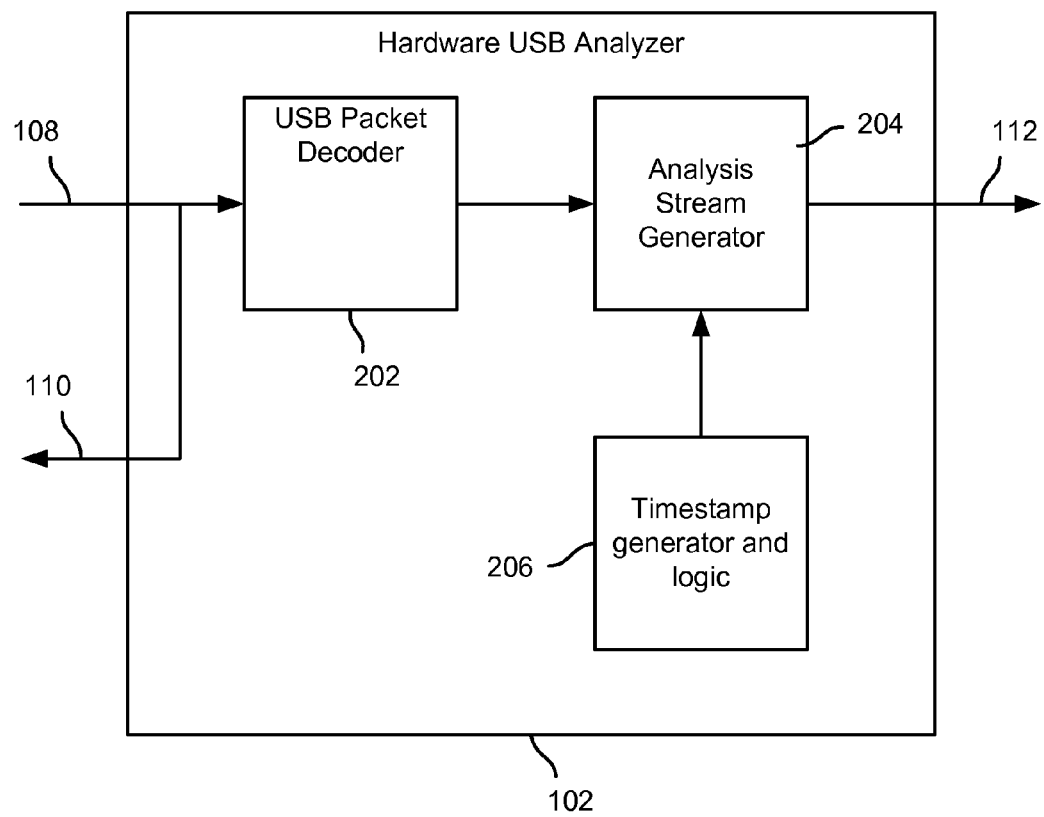
FIG. 2 is a block diagram illustrating an embodiment of a USB analyzer.

FIG. 2 is a block diagram illustrating an embodiment of a USB analyzer. In the example shown, hardware USB analyzer 102 of FIG. 1 is shown to include a USB packet decoder 202 configured to receive and decode signals sent between the target device and target host shown in FIG. 1. In the example shown in FIG. 2 arrows indicate observation of a packet sent by the target device 104 via connection 108 intended for the target host 106 connected to the analyzer 102 via connection 110; however packets sent from the host to the device also would be received and decoded. The USB packet decoder 202 provides observed packets to an analysis stream generator 204, which includes observed packets in an analysis stream provided as output on connection 112 to the analysis PC. In some embodiments, the analyzer 102 affixes an analyzer timestamp to each observed packet sent via connection 112. In the example shown, a timestamp generator and logic 206 generates and provides the timestamp. In some embodiments, during periods of inactivity on the monitored bus (i.e., 108, 110 in this example) the analysis stream generator is configured to output, for example periodically, a "no activity" or other period packet indicating that no packet has been observed on the monitored bus during an associated period. For example, in some embodiments the analyzer timestamp comprises 16 bits, and a "no activity" packet is sent every time the timestamp rolls over without an observed packet being seen on the monitored bus.

Figure 3:
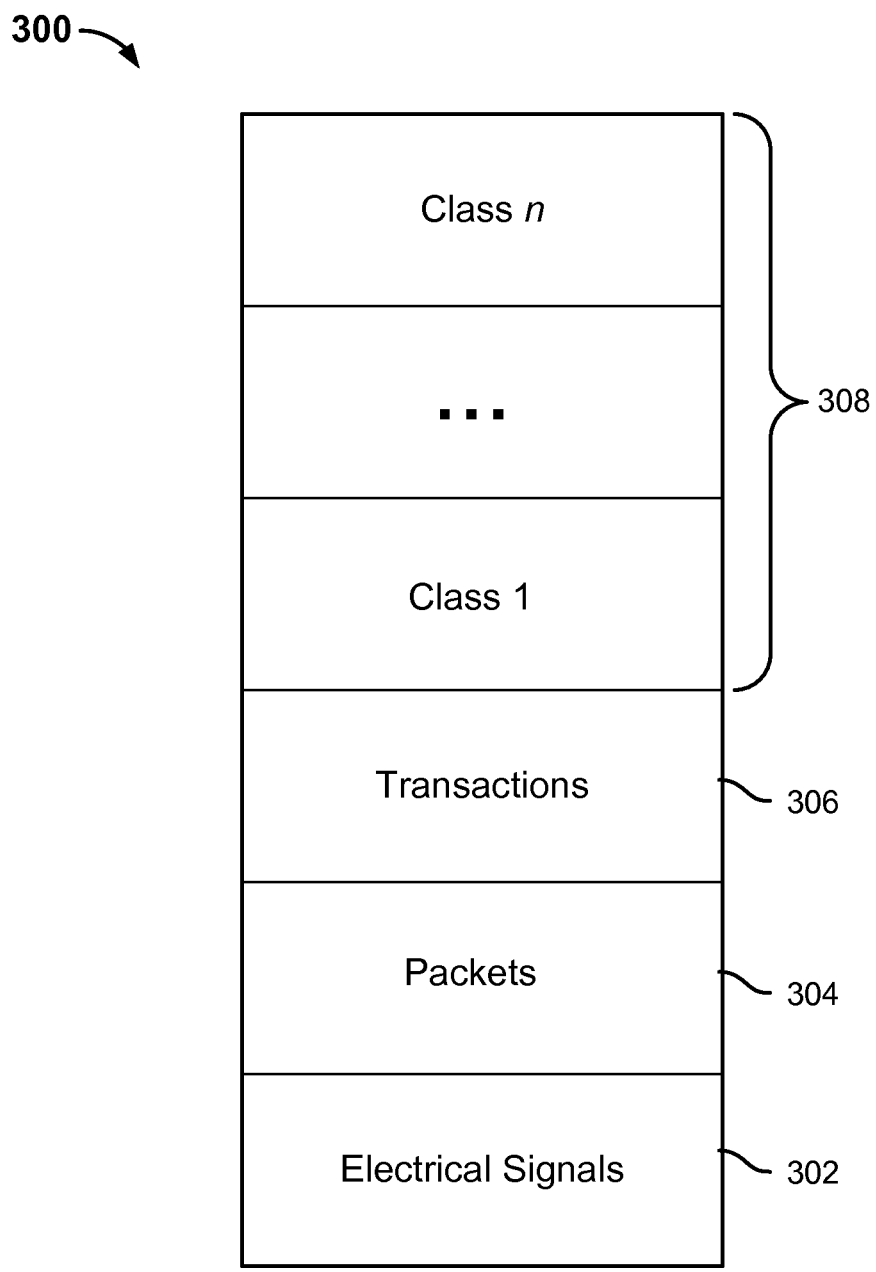
FIG. 3 is a block diagram that provides a conceptual representation of various semantic levels that may be associated with USB data.

FIG. 3 is a block diagram that provides a conceptual representation of various semantic levels that may be associated with USB data. In the example shown, the multi-layer conceptual representation 300 comprises an electrical signal layer 302. At the physical wire and connector level, USB devices and target hosts send and receive signals on wires. For example, a USB 1.0 or 2.0 cable has 4 wires, two for power (Vcc, GND) and two for data (D+, D−). Signals on the bus a decoded to identify corresponding packets (304).

A series of packets exchanged in a prescribed sequence comprise a transaction (306). For example, an "IN" transaction by which a host polls and receives data from a device may comprise an "IN" packet sent by the host to the device, a "DATA" packet sent by the device back to the host, and an "ACK" packet from the host to the device acknowledging receipt of the data. (If the device had no data, the device would respond to the IN packet with a "NAK" packet, and that would be the end of that particular exchange.) Another example is an "OUT" transaction (OUT packet from host to device, followed by DATA packet providing data from host to device, followed finally by an ACK packet from the device to the host acknowledging receipt of the data). USB classes enable a further semantic level to be understood and used. At the class level, and depending on the class, subclass, etc., a set of one or more related transactions may comprise a class level transfer, command, instruction, etc. For example, in the case of a USB device in the "mass storage" class, a "read" transfer may comprises a "command transport" used to initiate the operation, a "data transport" to transfer the data, and a "status transport" to mark completion of the transfer and synchronize state. Each of these "transports" may in turn comprise one or more transactions. For example, the data transport may comprise a series of IN transactions, each of which is used to deliver to the host a portion of the data requested to be read. As noted above, the class level meaning of a series of one or more transactions typically is defined in a class or class-related specification.

In FIG. 3 a plurality of classes 1 through n (308) are represented. In some embodiments, e.g., in the context of a device in a particular configuration connected to a compatible host, one or more classes, subclasses, and/or class and/or sub-class specific protocols and/or configurations may apply. In some embodiments, class, subclass, protocol, and/or device descriptor information may be provided by the device and/or exchanged upon initial connection and/or startup (e.g., boot) and may include the enumeration information mentioned above and/or post-enumeration information such as device descriptor information. In various embodiments, such enumeration and/or post-enumeration information is used, e.g., by the analysis software on the analysis PC, to decode observed USB traffic to the class level and to present, e.g., via a display, information at the class level in a human readable form.

Figure 4:
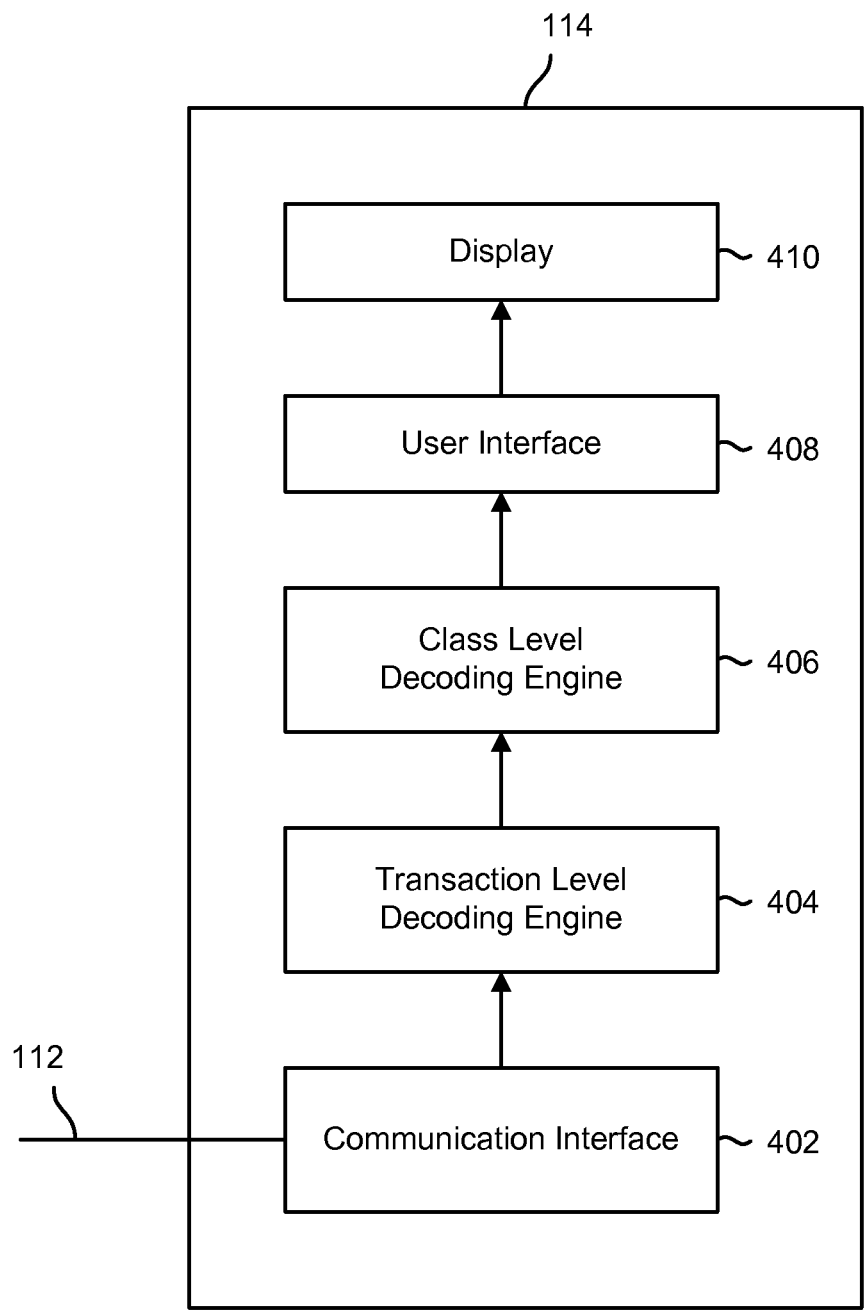
FIG. 4 is a block diagram illustrating an embodiment of an analysis PC.

FIG. 4 is a block diagram illustrating an embodiment of an analysis PC. In the example shown, the analysis PC 114 of FIG. 1 is shown to include a communication interface 402, such as a USB, network, or other interface, configured to communication with a hardware USB analyzer via connection 112. The communication interface 402 provides observed packets (and other data, such as the periodic "no activity" packets mentioned above) comprising an analysis stream received via connection 112 to a transaction level decoding engine 404. Transaction level decoding engine 404 associates the packets into groups comprising transactions and provides transaction level information to class level decoding engine 406. In some embodiments, transaction level decoding engine 404 passes up to class level decoding engine 406 any "no activity" packets included in the analysis stream (or in some embodiments data comprising same, such as the analyzer timestamp). The class level decoding engine 406 analyzes the received transaction information to derive class level information, such as to identify class level transfers, commands, and instructions. In various embodiments, class level decoding engine 406 uses class and/or device descriptor and/or other data observed during device enumeration or post-enumeration to determine how to decode information at the class level.

Figure 7:
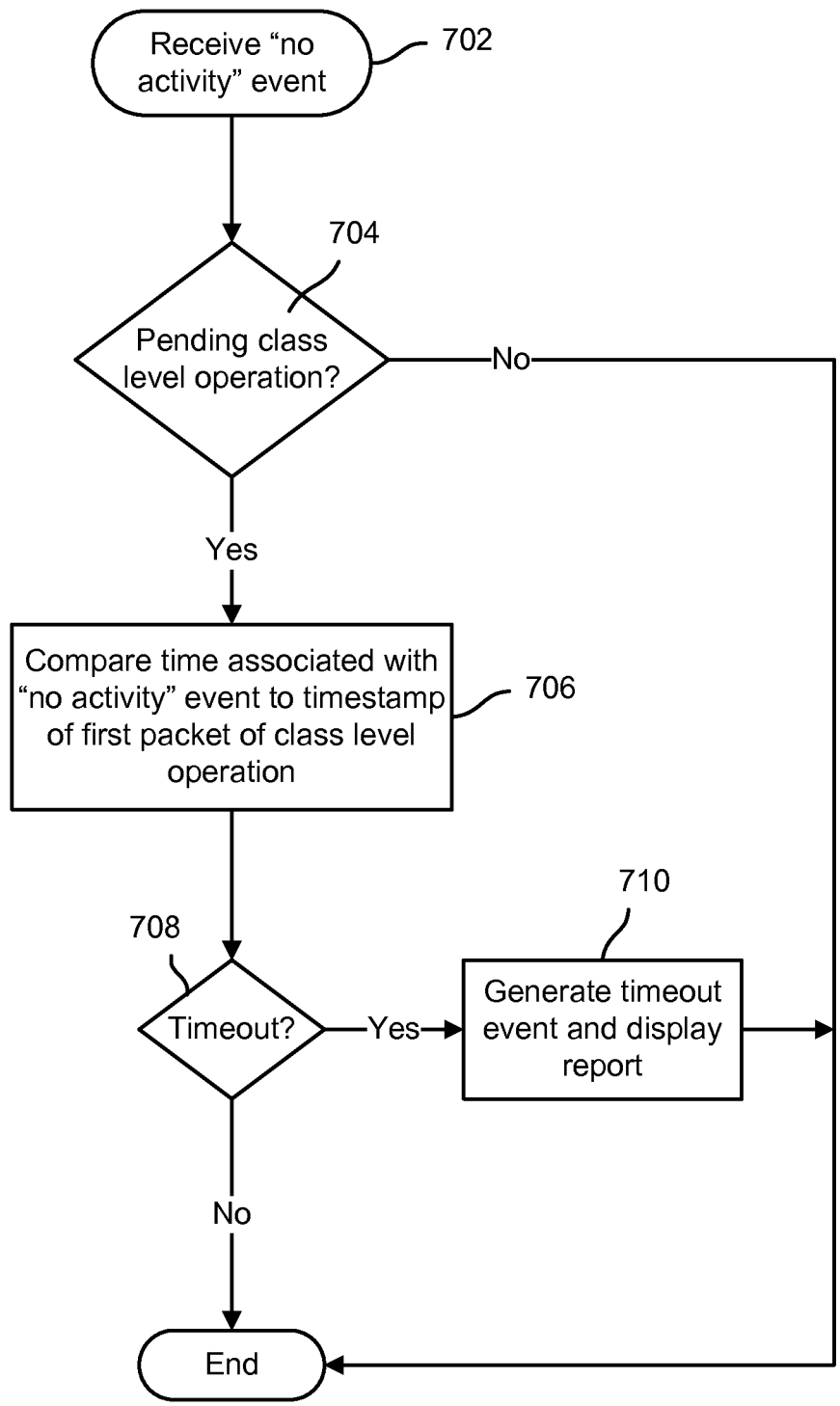
FIG. 7 is a flow diagram illustrating an embodiment of a process to generate timeouts in light of class level context.

In some embodiments, class level decoding engine 406 is configured to receive "no activity" packets or other periodic packets generated by the analyzer during periods of quiet on the monitored bus, and/or data comprising same, such as the analyzer timestamp, and to use the received no activity data along with an awareness of class level state (e.g., which if any class level operations are pending) to generate and display class level timeout events, as described more fully below in connection with FIG. 7.

In the example shown in FIG. 4, a user interface code 408 receives information from the class level decoding engine and displays class level information via a display device 410. In some embodiments, user interface code 408 responds to inputs, e.g., from a user, selecting a view to be displayed. For example, in some embodiments if "classification" or "class level decoding" are enabled, information decoded to the class level is displayed; but if classification is not enabled then transaction level information is displayed. In various embodiments one or more of transaction level decoding engine 404, class level decoding engine 406, and user interface code 408 comprises an entity provided by using a processor comprising PC 114 to execute associated software instructions.

Figure 5:
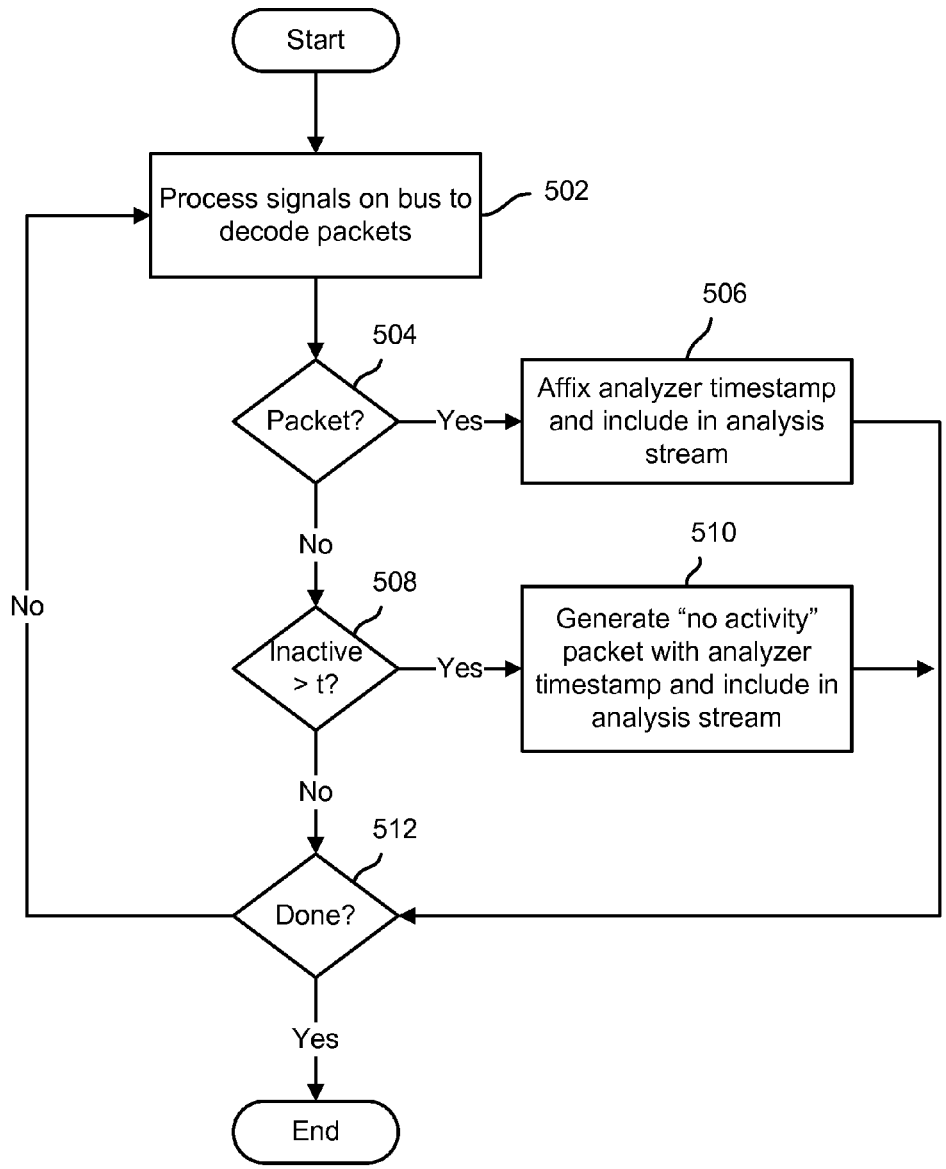
FIG. 5 is a flow diagram illustrating an embodiment of a process to generate an analysis stream.

FIG. 5 is a flow diagram illustrating an embodiment of a process to generate an analysis stream. In some embodiments, the process of FIG. 5 is implemented on a hardware USB analyzer. In the example shown, electrical signals sensed on the monitored bus are decoded into packets (502), for example by decoder 202 of FIG. 2. Once a packet is decoded (504), an analyzer packet including the observed USB packet data, a timestamp, and other attributes is included in an analysis stream provided as output (506). If no packet has been detected within a prescribed (e.g., configurable) period (508), a "no activity" packet bearing an analyzer timestamp is generated and included in the analysis stream (510). In some embodiments, a "no activity" or other packet is output periodically by the analyzer regardless of whether there has been activity on the monitored bus, and in some such embodiments step 508 is omitted and/or comprises a step of determining whether the time to provide the "no activity" or other periodic packet as output has arrived. In some embodiments, a 16 bit analyzer timestamp is used and a periodic packet output, regardless of activity on the monitored bus, each time an associated counter rolls over. Operation continues as described above until done (512), e.g., the analyzer is disconnected and/or a stop command is received from the analysis PC.

Figure 6:
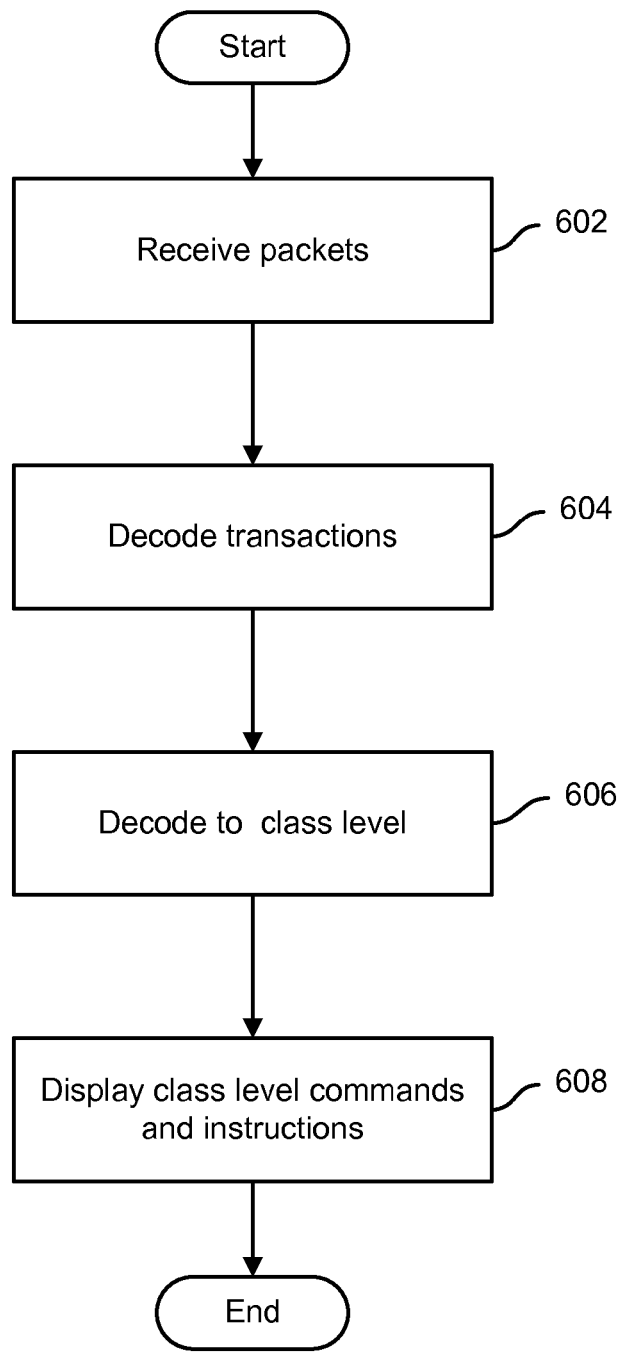
FIG. 6 is a flow diagram illustrating an embodiment of a process to decode and display monitored USB data.

FIG. 6 is a flow diagram illustrating an embodiment of a process to decode and display monitored USB data. In some embodiments, the process of FIG. 6 is implemented by an analysis computer such as analysis PC 114 of FIGS. 1 and 4. In the example shown, as packets are received (602) they are decoded to the transaction level (604). Transaction level information is in turn decoded to the class level (606), and class level operations, commands, and instructions are displayed (608).

FIG. 7 is a flow diagram illustrating an embodiment of a process to generate timeouts in light of class level context. In some embodiment, the process of FIG. 7 is implemented by a class level decoding engine such as class level decoding engine 406 of FIG. 4. In the example shown, a "no activity" event is received (702). In various embodiments, the no activity event may comprise a no activity packet generated and sent by the USB analyzer and/or an event or other record or indication derived therefrom. For example, in some embodiments a USB analyzer is configured to output a dummy or other packet every time a 16-bit or other counter rolls over. The analysis PC is configured to generate a time out event if, for example, n such dummy or other no activity packets are received without an intervening packet comprising data observed on the monitored bus. In some embodiments, at intervening levels of along the path to the class level decoding engine, one or more such events may be collected and a next level timeout event generated. For example, the transaction level decoding engine may accumulate m packet level timeout events before generating a transaction level timeout and/or passing up to the class level decoding engine a transaction level generated timeout event. Once the timeout event is received at the class level decoding engine (702), if a class level operation is pending (704)—for example one or more transactions comprising a class level transfer have been observed but one or more remaining transactions expected to be received in connection with the class level transfer, for example by virtue of the requirements and protocols set forth in applicable class specifications—a time associated with the "no activity" event is compared with a time associated with the class level operation, e.g., a timestamp of a first received packet associated with the class level operation (706). If the elapsed time exceeds a prescribed threshold (708) a class level timeout event is generated and an associated alert displayed to the user (710). In some embodiments, the elapsed time is determined by accumulating successive transaction level or other received timeout events and generating a class level timeout event if more than a prescribed number of such received timeout events are received successively without a class level operation completion event being provided by the class level decoding engine as output. If no class level timeout has been determined to have occurred, or if no class level operation is pending, or once the timeout event is generated and alert displayed, the process ends.

FIG. 8 is a block diagram illustrating an embodiment of a display of monitored USB data decoded to a class level. In the example shown, the display 800 includes a record column 802 in which information describing the nature and meaning of a class level record is displayed and a data column 804 in which corresponding data associated with the record is displayed. In the example shown, data associated with an operation to read data from a USB mass storage device is displayed. In the first line (row) the "read" operation is represented by a "read" record, with a minus symbol indicating the record has been expanded to show component records in subsequent rows. In the data column data indicating the logical block address (LBA) and length of the data to be read, along with an indication that the operation was observed to have been completed successfully ("passed"), are displayed. The read operation is shown to comprise a command transport, a data transport, and a status transport. The data transport record has been expanded to show a plurality of IN transactions comprising the data transport. A first IN transaction has been expanded to shown the IN, DATA, and ACK packets that comprise the transaction. In some embodiments, if the sequence of transports shown in FIG. 8 had not been observed to have been completed within a prescribed time, an error or other indication would have been displayed. For example, in some embodiments, based on an awareness of the class level context (here, a pending read from a device that is a member of a "mass storage" class of device), a class level decoding engine or related element is configured to generate a timeout if a prescribed amount of time has passed between a last confirmed transaction one or more subsequent transactions and/or packets expected to be received to indicate completion of the class level operation, as determined for example based on a "no activity" or like packet and/or information received from the analyzer and propagated up to the class level decoding engine. In such a case, a "timeout" or other error, instead of the "passed" status displayed in FIG. 8, would be displayed.

Using the approach described above, a timeout or other error in completion of a class level transfer or other class level operation can be detected in real time. In non-real-time analysis, it is possible to look ahead in the analysis stream to see whether and/or at what time subsequent packets associated with a class level transfer were received. However, to perform real-time analysis, and in particular to timely detect timeouts and display an associated alert to a user in real-time, techniques such as those described herein are required to enable the analysis software to determine, in real-time and without the benefit of being able to look indefinitely into the future, that a class level operation has timed out. Otherwise, the user's experience would be that the display would not change, which could be caused by reasons other than a failure in completion of the class level transfer, e.g., failure of the hardware analyzer, a problem with the connection between the analyzer and the analysis PC, and/or a failure of the analysis software and/or PC.

In various embodiments, a hardware USB analyzer and/or analysis PC is configured to use a circular buffer to store packets and/or records comprising a monitored USB stream. Once a connection is established and data is observed on the monitored bus, packets are decoded and associated records stored in the circular buffer, for further use and analysis in the event an indication is received that real-time "capture" and analysis are desired. A circular buffer is used to limit the memory or other storage used to store records. Once the command to begin real-time capture is received, records are pulled from the buffer and analyzed, e.g., by decoding information to the transaction and/or class level, as applicable.

Figure 9:
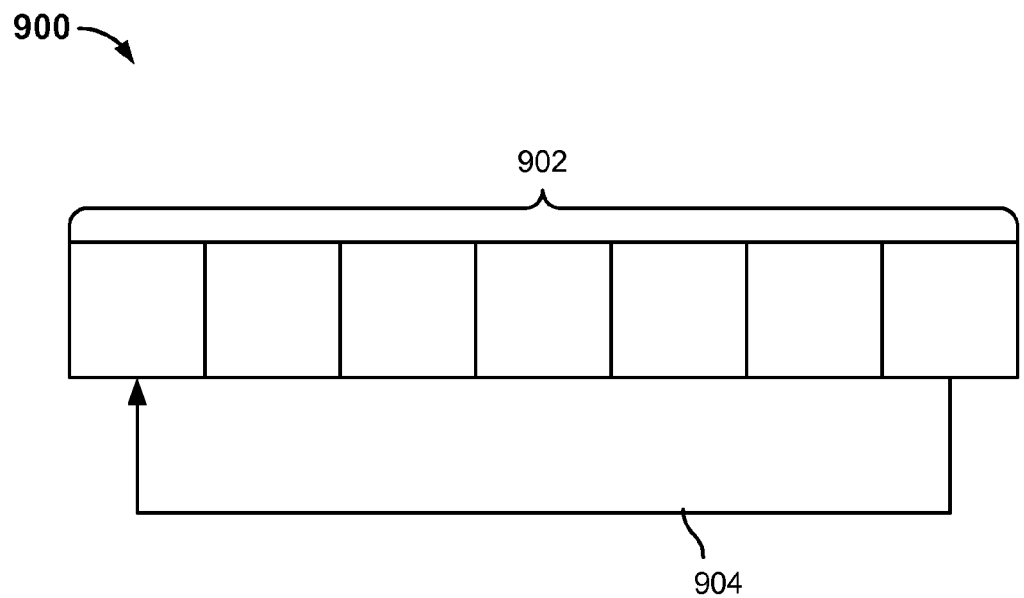
FIG. 9 is a block diagram illustrating an embodiment of a circular buffer.

FIG. 9 is a block diagram illustrating an embodiment of a circular buffer. In the example shown, circular buffer 900 comprises a plurality of storage locations 902 into which an allocated block of memory or other storage has been organized. Conceptually, in some embodiments a first record would be stored in the leftmost location, a next record in a next location to the right, etc., until a last (in this case rightmost) storage location was reached. As indicated by the arrow 904, a next-received data would be stored in the leftmost location, overwriting the data stored in that location as the outset. Writing (storage) would advance to the right, overwriting previously stored data, until the last location was reached again, at which point writing would return to the first location, etc. This approach allows a limited amount of storage to be allocated to store observed USB data, however once the buffer has been filled new data can only be stored by overwriting data observed and stored earlier. Absent the use of techniques described herein, this approach could result in the overwriting of data that may be required in the future to support class level decoding in real-time, such as enumeration information and device descriptor information, which typically is exchanged when a device is first connected and/or at startup and, therefore, may be among the data that would first be overwritten once a circular buffer becomes full.

In some embodiments, data that may be required in the future to enable class level decoding in real-time of a USB data stream as it is received, such as enumeration and device descriptor information, is stored in another location (other than the circular buffer) prior to its being overwritten.

Figure 10A:
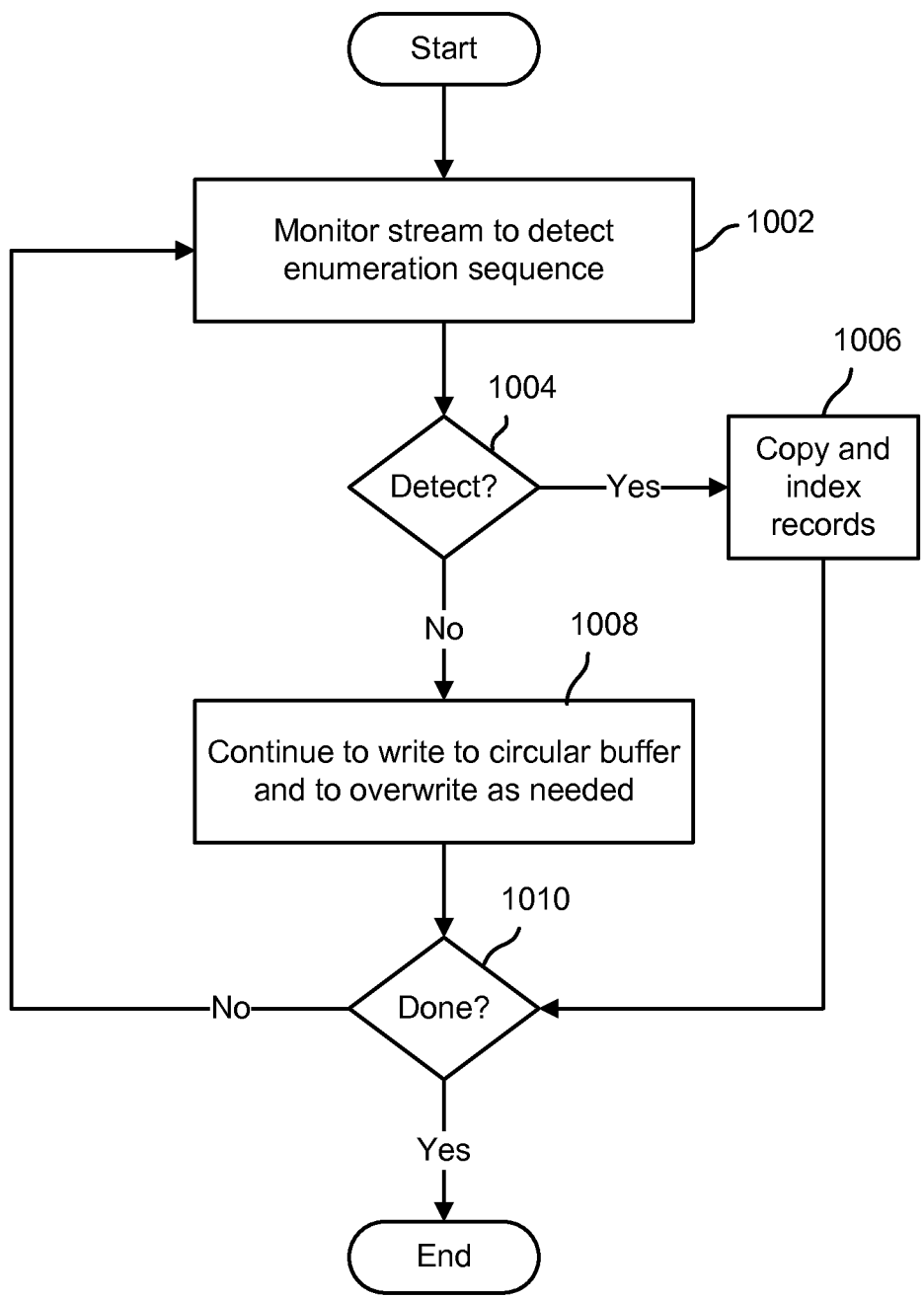
FIG. 10A is a flow diagram illustrating an embodiment of a process for preserving enumeration and related information.

FIG. 10A is a flow diagram illustrating an embodiment of a process for preserving enumeration and related information. In the example shown, USB data observed on a monitored bus is monitored to detect records comprising enumeration information (1002). Detected enumeration records (1004) are copied to storage location other than the circular buffer and indexed to facilitate retrieval (1006). Non-enumeration records and enumeration records alike are written to the circular buffer (1008). The process continues until done (1010), e.g., the analyzer is disconnected from the target device and/or target host.

Figure 10B:
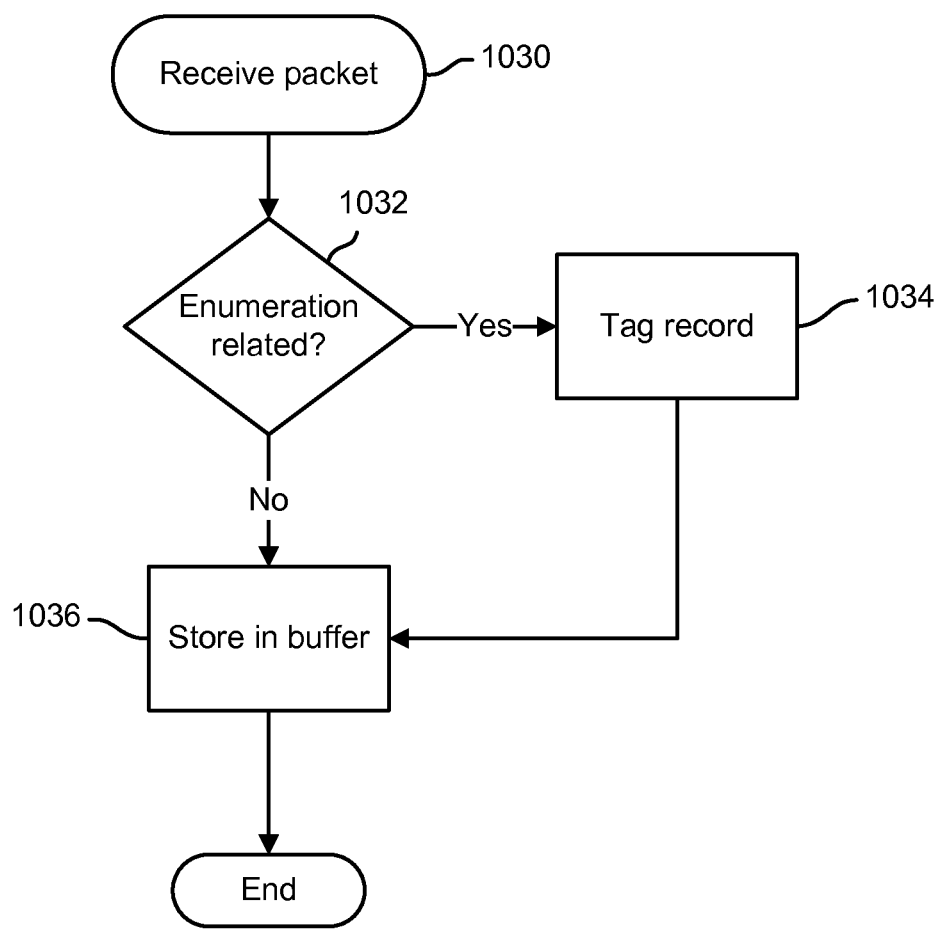
FIG. 10B is a flow diagram illustrating an embodiment of a process for preserving enumeration and related information.

FIG. 10B is a flow diagram illustrating an embodiment of a process for preserving enumeration and related information. In the example shown, when a packet is received (1030) it is determined whether it is enumeration (or other device class, identity, and/or configuration) related (1032). If so, the associated record is tagged as an enumeration record (1034). In some embodiments, enumeration records are tagged only if class level decoding is enabled. The untagged record (if the received packet was not enumeration related) or the tagged record (in the case of an enumeration record) is stored in the circular buffer (1036).

Figure 10C:
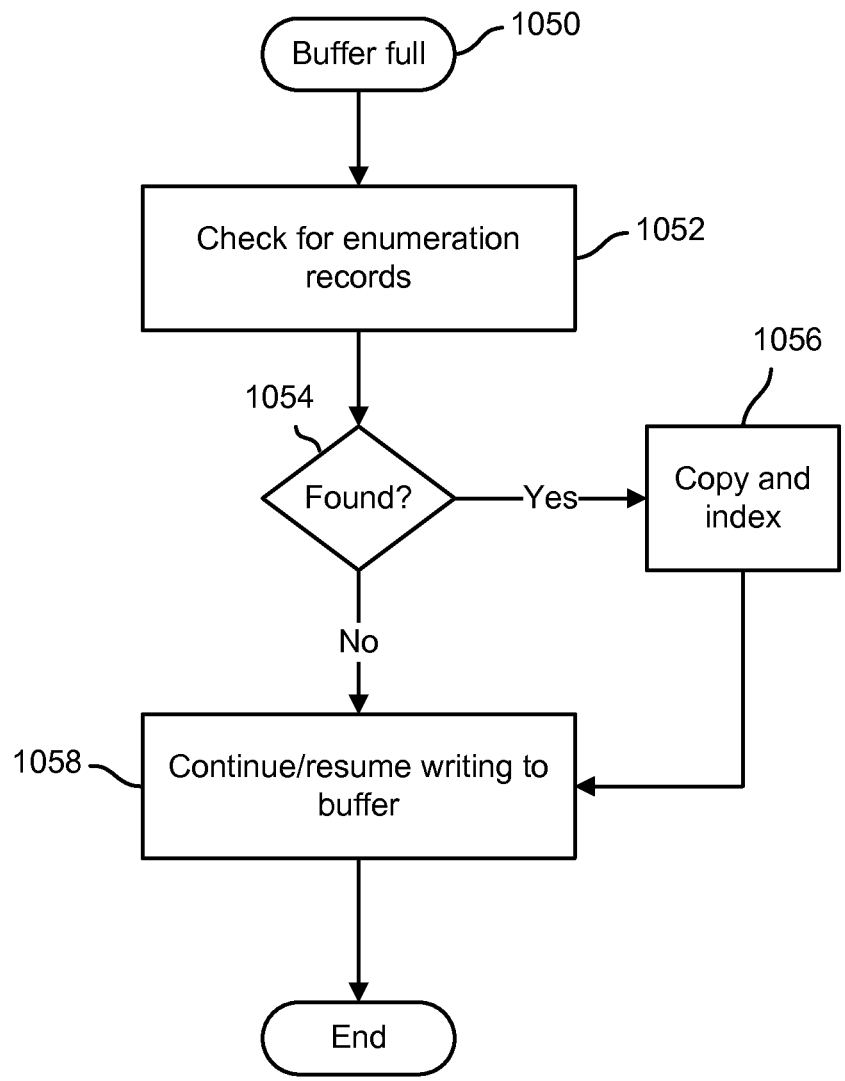
FIG. 10C is a flow diagram illustrating an embodiment of a process for preserving enumeration and related information.

FIG. 10C is a flow diagram illustrating an embodiment of a process for preserving enumeration and related information. In the example shown, upon receiving an indication that the circular buffer is full (or approaching being full) (1050), the buffer is checked for the presence of enumeration records (1052), e.g., by checking for tags such as those mentioned in connection with FIG. 10B. If any enumeration records are found (1054), they are copied to another location and indexed (1056). If no enumeration records are found (1054) or if so once all such records have been copied and indexed (1056), writing the circular buffer continues/resumes (1058), including as applicable overwriting previously stored enumeration (if any) and/or non-enumeration records.

Figure 11:
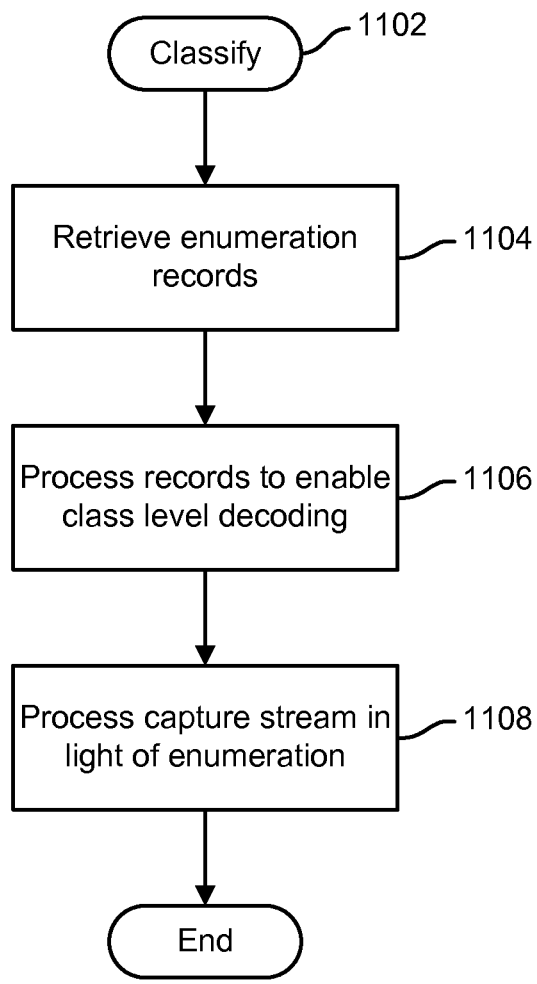
FIG. 11 is a flow diagram illustrating an embodiment of a process for real-time class level decoding.

FIG. 11 is a flow diagram illustrating an embodiment of a process for real-time class level decoding. In the example shown, upon receiving an indication to begin real-time class level decoding (1102), enumeration records associated with the target device are retrieved (1104). In some embodiments, the records are retrieved either from the circular buffer, if still present there, or if not from a location to which they have been copied. In some embodiments, a location into which enumeration records would have been copied, if needed to avoid their being overwritten, is checked; if enumeration records are present they are retrieved and used, if not the records are played from the buffer in order and enumeration records are processed as they are encountered. Once retrieved (and/or encountered in the buffer) enumeration records are processed and associated device information is extracted, displayed, and/or used to configure the class level decoding engine to decode associated USB data to the class level (1106). Once the enumeration records have been processed subsequent records are processed in light of the enumeration information determined from the enumeration records, including by decoding information to the class level in light of the device and other enumeration information derived from the enumeration records (1108).

USB target devices and hosts generate some packets that are required for proper operation and implementation of applicable USB protocols but which typically are not, at least individually, of particular interest to a developer. For example, a start of frame (SOF) packet is output periodically by a target host to delineate frame boundaries. Likewise, the USB protocols are host-centric, so typically a host will periodically poll connected devices to invite them to send data to the host. If the device has no data, e.g., a mouse or other input device that has not been touched by the user for a time, a sequence of IN packets inviting the device to send data and responsive NAK packets indicating the device has no data for the host will be sent. Displays have limited physical dimensions and resulting display area, and one can see by referring to FIG. 8 for example that during relatively idle period or periods when activity of interest is occurring but on a relatively slow time scale the display could become filled with a series of IN-NAK pairs or SOF packet records, pushing information of interest out of the viewing area, or obscuring such information by interspersing uninteresting records that are in this sense merely noise.

In some embodiments, records associated with packets or other data that is not expected to be of particular interest are not necessarily displayed individually and/or immediately. Instead, such records are accumulated and represented as a group, for example in a manner that does not interfere with the display of other records that may be of greater interest. In various embodiments, packets, transactions, and/or other data and events not likely to be of interest are accumulated. Once a transaction and/or class level event is ready to be displayed, the accumulated records not of interest and/or a group representation of them, is/are displayed, for example, in a row or other area just above or otherwise adjacent to and/or separate from a display area in which the transaction and/or class level record(s) is/are to be displayed.

Figure 12:
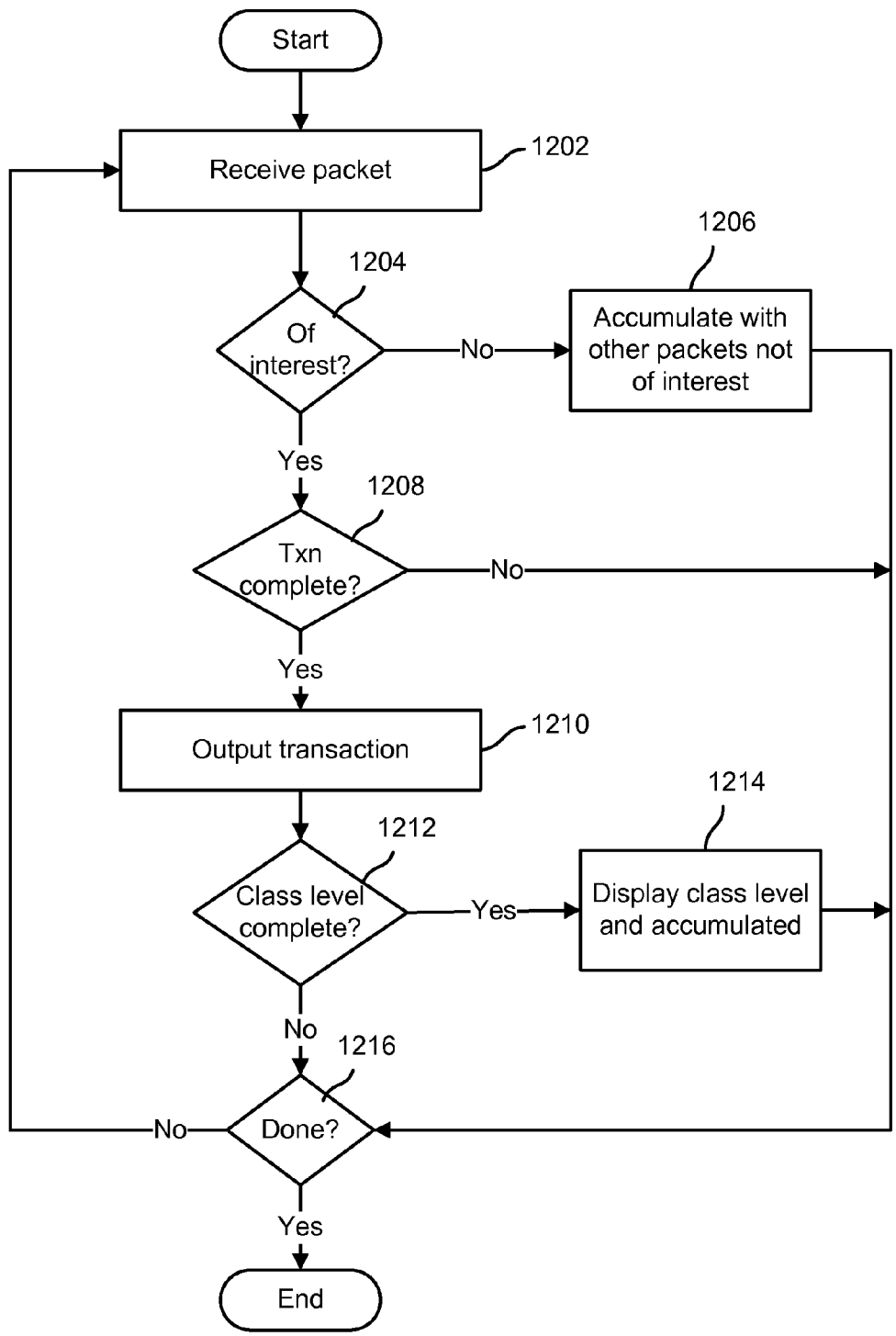
FIG. 12 is a flow diagram illustrating an embodiment of a process for displaying USB class level information.

FIG. 12 is a flow diagram illustrating an embodiment of a process for displaying USB class level information. In the example shown, when a packet is received (1202) a determination is made whether the packet is likely to be of interest (1204), e.g., based on the packet type and/or a transaction or other interaction with which the packet is associated. For example, SOF packets and IN-NAK packet pairs may be deemed not likely to be of interest. If a received packet (1202) is not likely to be of interest (1204), the packet is accumulated with other similar packets (1206) and not immediately displayed. If a packet is of interest (1204), a determination is made whether a transaction with which it is associated is complete (1208). If so, an associated transaction record is generated (1210) and, depending on the display mode and user actions, displayed. For example, in the example shown in FIG. 8 records associated with transactions comprising the data transport are displayed, whereas those comprising the command transport and the status transport are not. In a transaction record is generated (1210), a determination is made as to whether a class level transfer or other operation with which the transaction is associated is complete (1212). If so, a record associated with the class level transfer or other operation is generated and displayed and a group representation of any accumulated records not likely to be of interest is displayed, e.g., just before or other near or as part of the class records. The process continues as subsequent packets are received and process, until done (1216).

Figure 13:
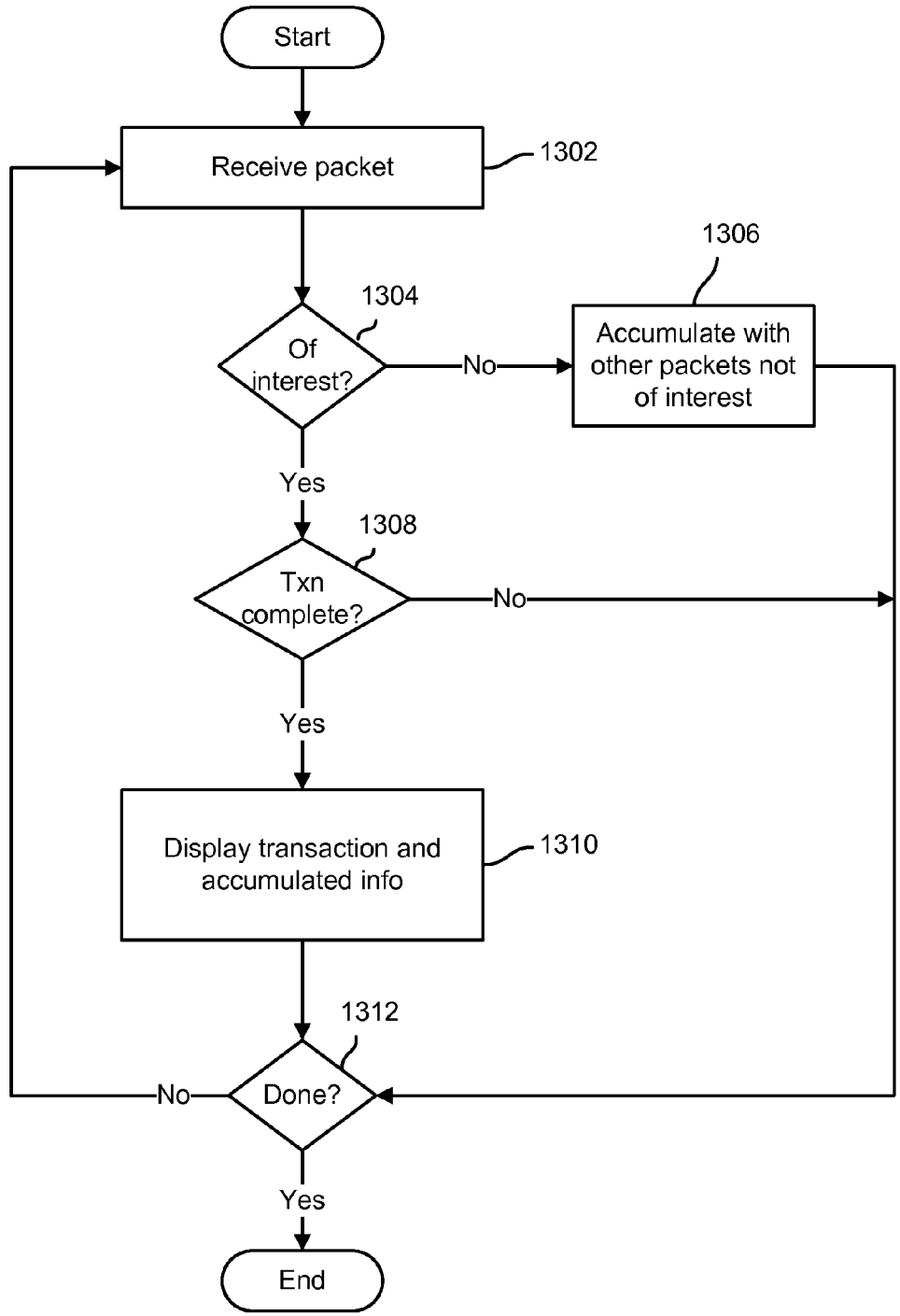
FIG. 13 is a flow diagram illustrating an embodiment of a process for USB transaction level information.

FIG. 13 is a flow diagram illustrating an embodiment of a process for USB transaction level information. In the example shown, a packet is received (1302). If the packet is not of interest (1304) it is accumulated with similar packets (if any) and not immediately displayed (1306). If the packet is of interest and an associated transaction is now complete (1308), a record associated with the transaction and a group representation of any accumulated packets not deemed to be of interest are displayed (1310). The process continues until done (1312).

Figure 14:
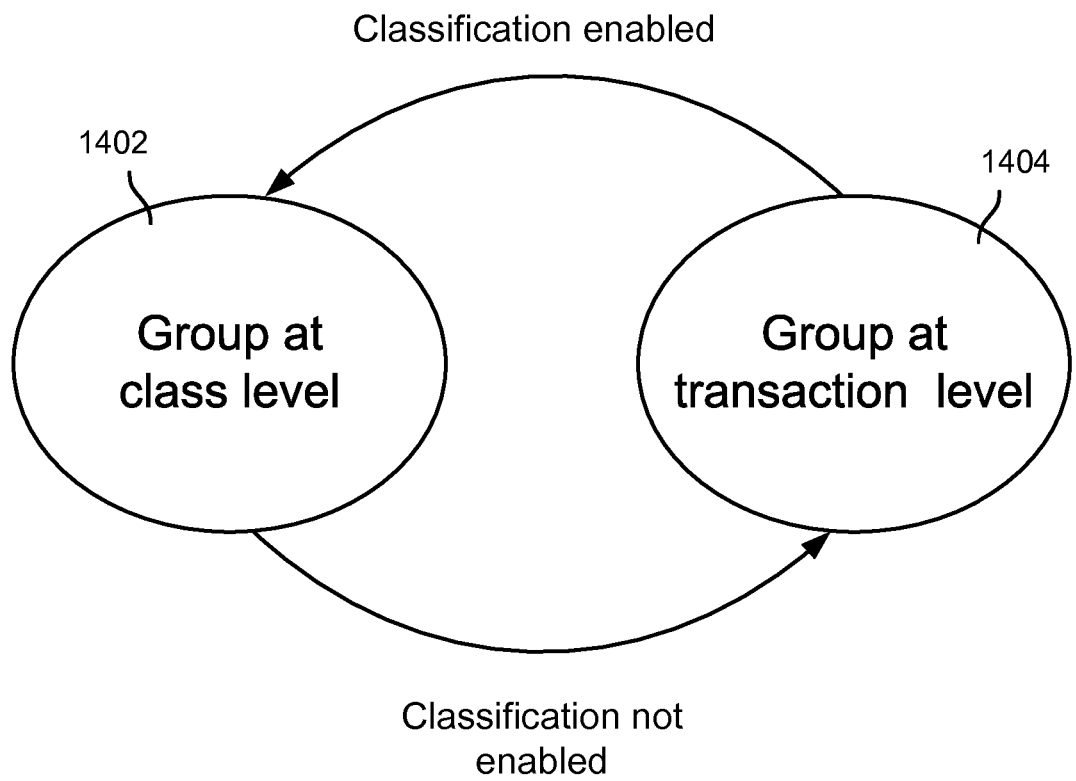
FIG. 14 is a state diagram illustrating an embodiment of a process to switch between class level and transaction level views.

FIG. 14 is a state diagram illustrating an embodiment of a process to switch between class level and transaction level views. In the example shown, a display can be toggled between a first view (1402) in which records not considered of particular interest are accumulated and represented as a group based on class level events, as in FIG. 12, and a second view (1404) in which records not considered of particular interest are accumulated and represented as a group based on transaction level events, as in FIG. 13. Using this approach, records not of interest are represented in the manner that least interferes with the display of information likely to be of interest, either at the class level or transaction level, depending on which class level decoding (and/or an associated view) has been enable.

Figure 15:
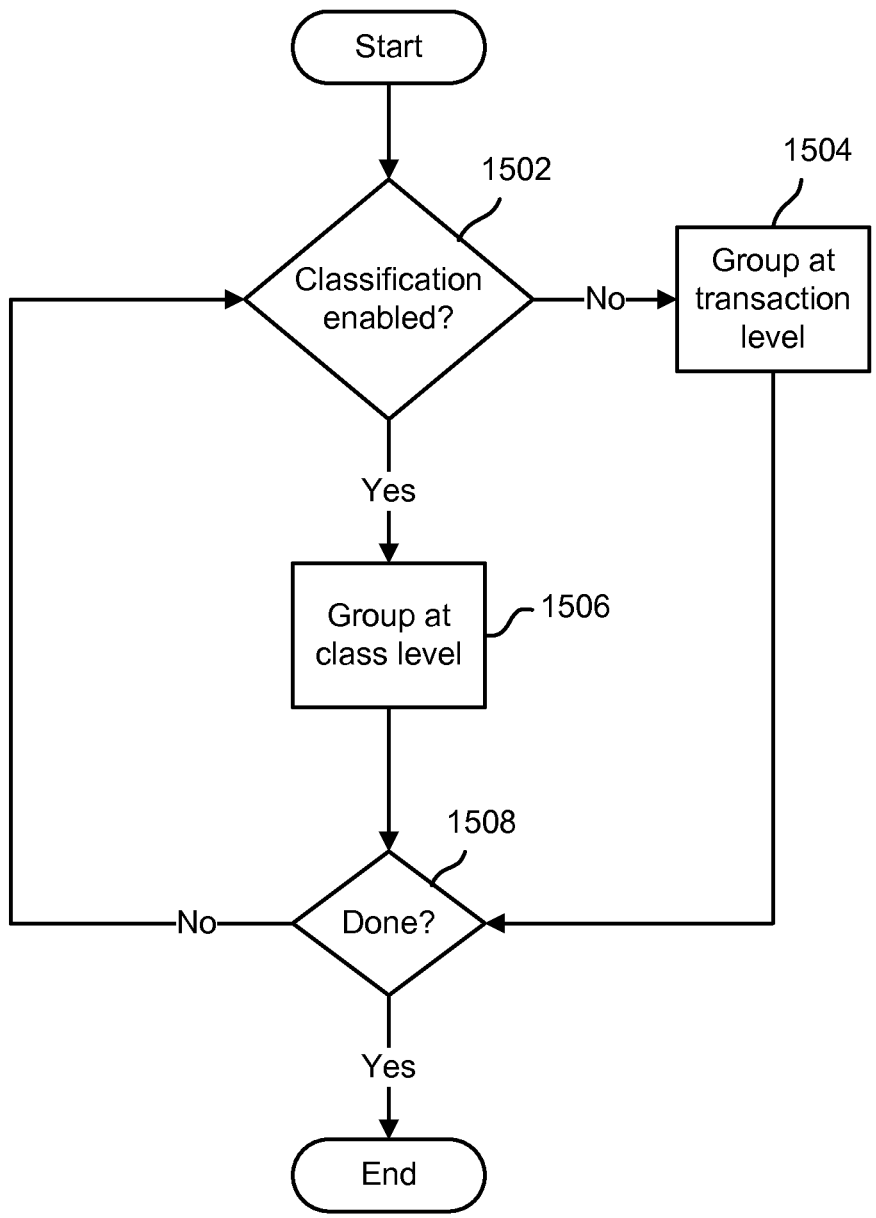
FIG. 15 is a state diagram illustrating an embodiment of a process to switch between class level and transaction level views.

FIG. 15 is a state diagram illustrating an embodiment of a process to switch between class level and transaction level views. In some embodiments, the process of FIG. 15 implements the state diagram of FIG. 14. In the example shown, if classification (i.e., class level decoding) is not enabled (1502), records not considered likely to be of interest are grouped and displayed at the transaction level (1504). If classification is enabled (1502), records not considered likely to be of interest are grouped and displayed at the class level (1506). The process continues until done (1508).

FIG. 16 is a block diagram illustrating an embodiment of a class level view. In the example shown, display 1600 includes a record column 1602 and a data column 1604. The device may be, for example, a mass storage device. In the example shown records associated with three "read" transfers at the class level are displayed. The first transfer is shown in the first row, in a "collapsed" fashion with summary information shown in the data column and the "passed" status indicated. In the second row, immediately before the display of records associated with a second "read" beginning with the third row, a group representation of 93 intervening SOF packets is displayed, with a summary listing of the frames they represent in the data column. Note that displaying 93 SOF packets in successive rows would have resulted in the user being required to scroll down through 93 records before seeing the next "read" transfer. In the example shown, the "read" transfer record for the second transfer shown in FIG. 16, beginning on the third row, has been expanded to show in addition component records for the command transport, data transport, and status transport class level events comprising the transfer. In this example, nine SOF packets that may have been intersperse with the packets comprising the component class leave transports and/or transactions comprising those transports are represented as a group in the first row after the top class level "read" record (i.e., the fourth row of the display 1600 as shown). In this way the component transports and the transactions comprising those transports can be viewed together, without intervening records that are not of interest.

Figure 17:
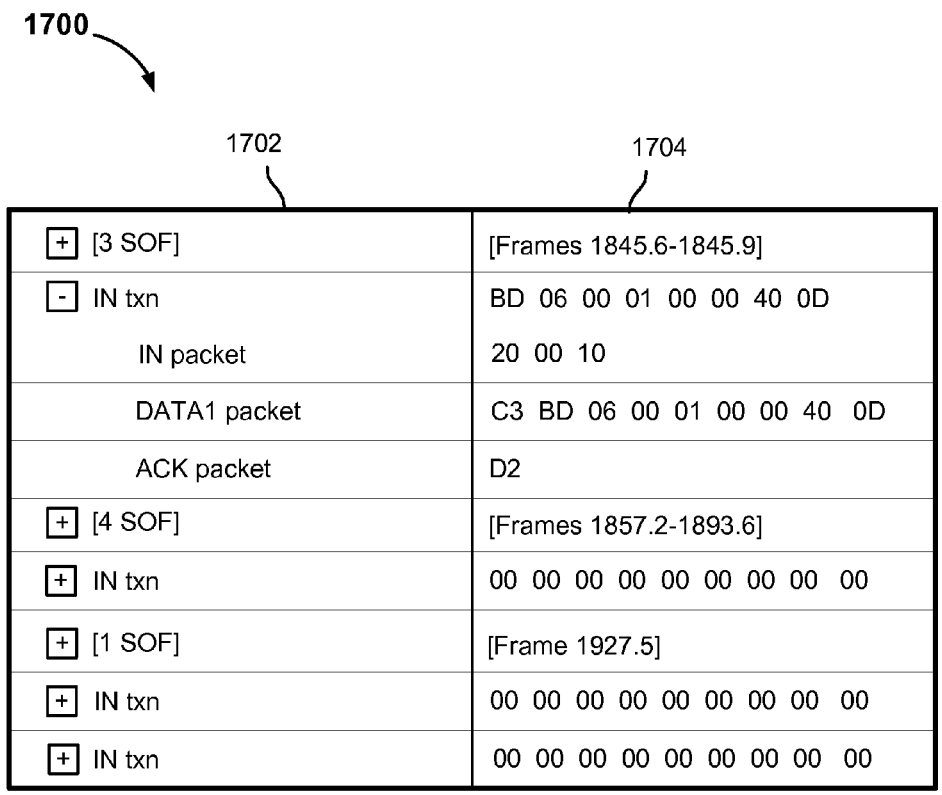
FIG. 17 is a block diagram illustrating an embodiment of a transaction level view.

FIG. 17 is a block diagram illustrating an embodiment of a transaction level view. In the example shown, display 1700 includes a record column 1702 and a data column 1704. In this example, a transaction level view is provided. Rather than grouping packets not of interest, here as in FIG. 16 SOF packets, around class level events, in the example shown in FIG. 17 such packets are grouped and displayed around transaction of interest. For example, in the first row a group of three SOF packets is represented in a single entry, prior to an expanded IN transaction record (and component packets). In some embodiments, even if one or more of the SOF packets had been interspersed in the traffic observed on the monitored bus, such packets would be represented by a group entry listed just prior to (or, alternatively, after) the record(s) associated with the transaction just prior to and/or during the pendency of which they were observed. For example, in the example shown in FIG. 17 if one or more of the three SOF packets occurred between the IN packet and the ACK packet shown in the third and fifth rows of the display 1700, such SOF packets would be represented as shown in FIG. 17, i.e., by a single group entry listed prior to the IN transaction record listed in the second row. Note that no SOF packets happened to have occurred between the final two IN transactions shown in the last two rows of FIG. 17.

While in various embodiments described above IN-NAK packet pairs and SOF packets are used as examples of packets that may not be of particular interest, for example to a user viewing a display of USB data monitored using a USB analyzer, the techniques described herein may be applied to display in a non-intrusive way other packets not of particular interest. For example, in the context of USB 3.0, packets that may not be of particular interest may include, without limitation, Isochronous Timestamp Packets (ITP), Link Up (LUP) and/or Link Down (LDN) packets, and/or Link Power Management packets such as LGO and/or LXU packets.

In various embodiments, the SOF and/or other packets not of interest that are displayed as collapsed groups as shown in FIG. 17 are interspersed between individual transactions that in some embodiments may eventually be grouped into a class-level parent record. In some embodiments, during the capture, individual SOF collapsed groups are preserved, regardless of the current display mode (i.e., transaction or class), which in various embodiments allows the user to switch display modes after the capture is over.

In some embodiments, when in class-level display mode, as in FIG. 16, all of the interspersed SOF collapsed groups that were interspersed in the middle of a parent-level class record as represented in a transaction display mode are collapsed and summed together. This results in previously individually-displayed SOF collapsed groups, for example with SOF counts of 3, 4, and 1 in the example shown in FIG. 17, being merged for representation in the class-level display (as in FIG. 16), resulting in this example in their being represented by a single group of 8 SOFs.

In various embodiments, timeouts are managed in real time for these collapsed SOF (and IN/NAK) groups so that if a legitimate class record spans a long period of time, collapsed SOF groups (summed over all of the transaction-level SOF groups) are emitted periodically and give a sense of bus activity to the user of the analyzer. In some embodiments, timeouts are managed on a "per bucket" basis (SOF, IN/NAK to a particular device+endpoint pair, PING/NAK, etc.).

Techniques described herein facilitate the display of monitored USB data, decoded to a class level, in real-time.

Figure 18:
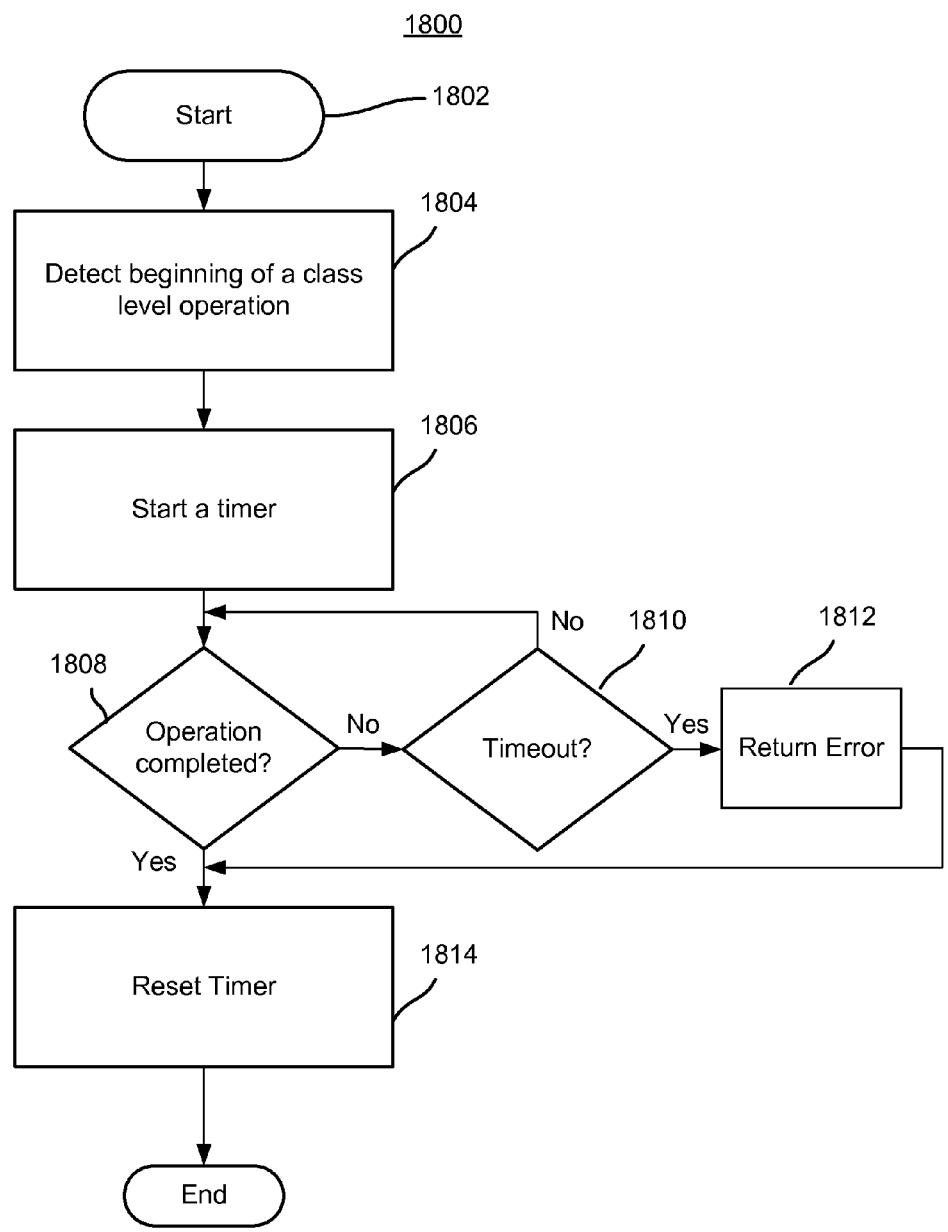
FIG. 18 is a flow diagram illustrating an additional embodiment of a process 1800 to generate timeouts in light of class level context.

FIG. 18 is a flow diagram illustrating an additional embodiment of a process 1800 to generate timeouts in light of class level context. In some embodiments, process 1800 of FIG. 18 is implemented by a class level decoding engine such as class level decoding engine 406 of FIG. 4. At 1804, the beginning of a class level operation is detected. After the class level operation is detected, a timer is started at 1806. For example, a timer at the analysis PC configured to expire after a predetermined period of time is started at 1806. The predetermined period of time may be based on an estimate of how long the class level operation takes to complete. At 1808, whether the class level operation is completed is determined. If the class level operation is completed before the timer expires, then the timer at the analysis PC is reset at 1814, and process 1800 is terminated without any timeout event. If the class level operation is not yet completed when the timer expires at 1810, then an error is returned at 1812, indicating that a timeout event has occurred. After the timeout event, the timer is reset at 1814, and process 1800 is terminated.

Figure 19:
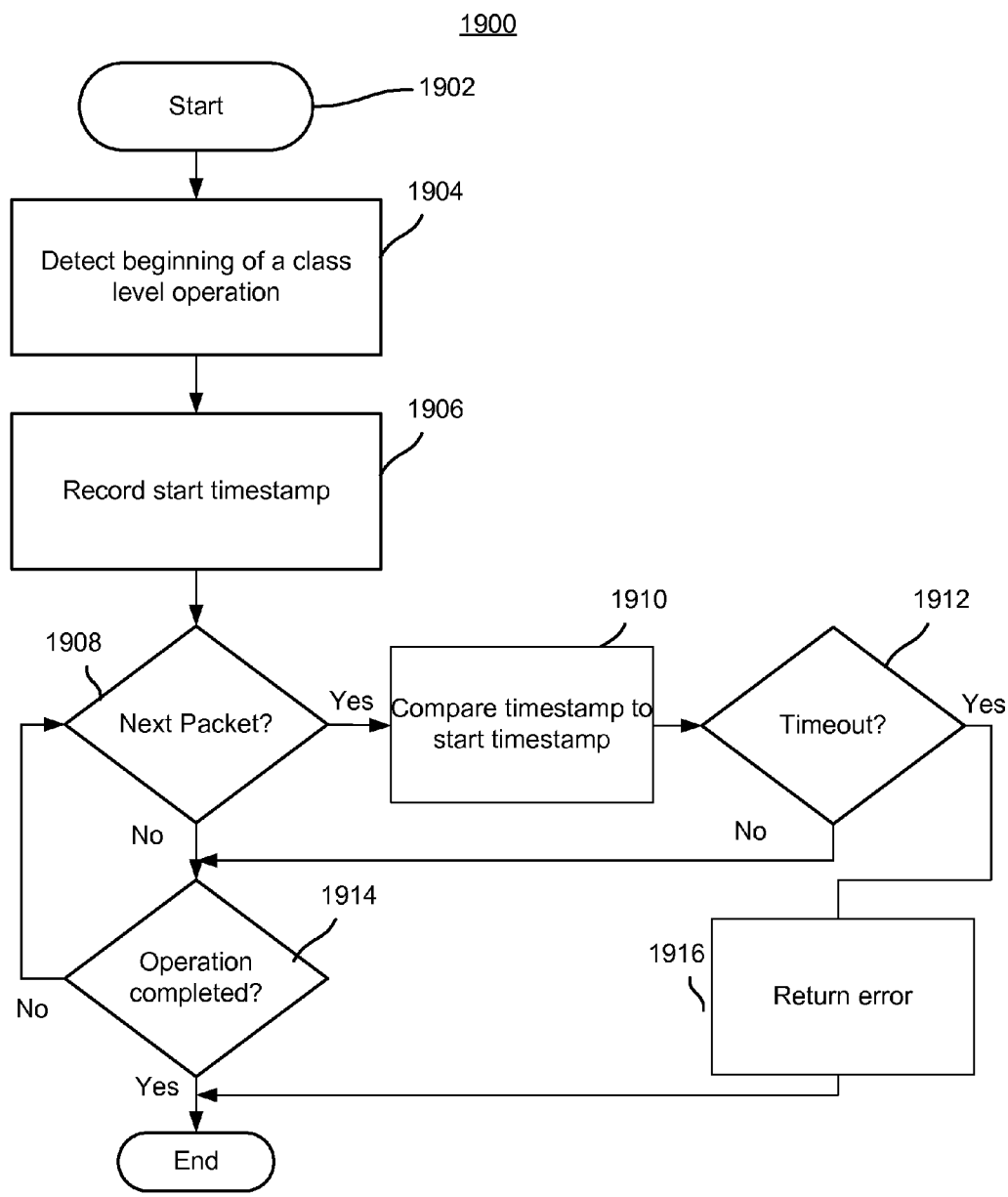
FIG. 19 is a flow diagram illustrating an additional embodiment of a process 1900 to generate timeouts in light of class level context.

FIG. 19 is a flow diagram illustrating an embodiment of a process 1900 to generate timeouts in light of class level context. In some embodiments, process 1900 of FIG. 19 is implemented by a class level decoding engine such as class level decoding engine 406 of FIG. 4. At 1904, the beginning of a class level operation is detected. After the class level operation is detected, a start timestamp is recorded at 1906. The start timestamp indicates the start time of the class level operation. For example, a timestamp of a first received packet associated with the class level operation is recorded at the analysis PC at 1906. At 1908, whether a next packet is received is determined. If a next packet is received, then the timestamp of the next packet is compared with the start timestamp at 1910. For example, if the elapsed time determined based on the comparison exceeds a predetermined threshold, then a timeout event has occurred at 1912, and an error is returned at 1916 before process 1900 is terminated. If the elapsed time determined based on the comparison has not exceeded the predetermined threshold, then a timeout event has not occurred at 1912, and process 1900 is continued by waiting for the next packet at 1908 or until the class level operation is completed.

Figure 20:
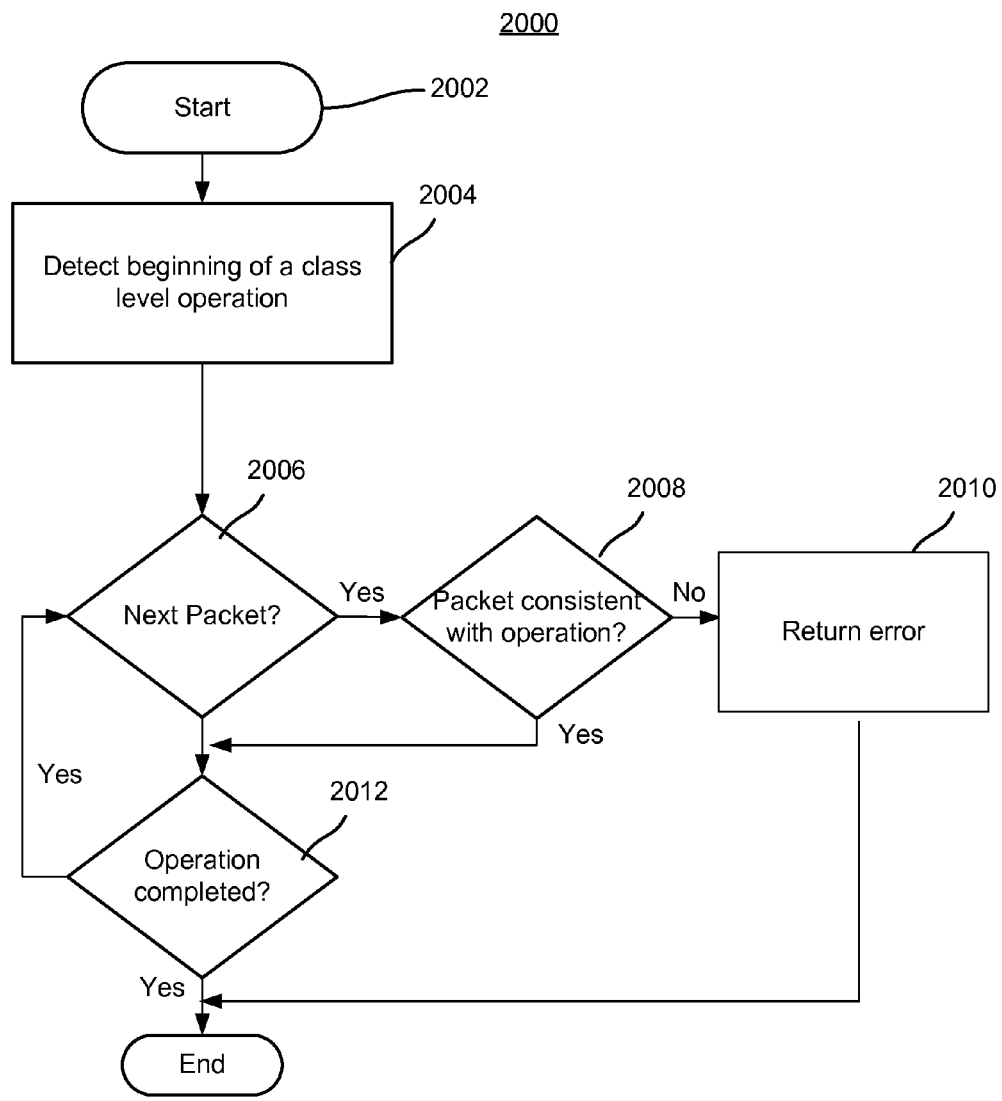
FIG. 20 is a flow diagram illustrating an additional embodiment of a process 2000 to generate timeouts in light of class level context.

FIG. 20 is a flow diagram illustrating an embodiment of a process 2000 to generate timeouts in light of class level context. In some embodiments, process 2000 of FIG. 20 is implemented by a class level decoding engine such as class level decoding engine 406 of FIG. 4. At 2004, the beginning of a class level operation is detected. At 2006, whether a next packet is received is determined. If a next packet is received, then whether the received next packet is consistent with the class level operation is determined at 2008. If the received next packet is not consistent with the class level operation, then an error is returned at 2010 to indicate that a timeout event has occurred. For example, if a particular type of packet is expected to be received next during a class level operation, but a different type of packet is received, then the received packet is considered inconsistent with the class level operation at 2008. In one illustrative example with two classes A and B, class A operation includes packets A0 A1 A2 A3 in that order, and class B operation includes packets B0 B1 B2 in that order. If packets A0 A1 B0 are received, then B0 is determined as inconsistent and an error is returned since class A operation has not yet completed. If packets A0 A1 B1 are received, an error is also returned. If packets A2 A3 are received, an error is also returned since A2 cannot appear at the beginning of a sequence.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of analyzing USB data, comprising:
   copying an enumeration record from a first storage location in a buffer configured to store USB data associated with a target USB device to a second storage location not in the buffer, based at least in part on an indication that the enumeration record as stored in the buffer may be overwritten;
   using the enumeration record as stored in the second location to perform USB class level decoding of a set of USB data associated with the target device; and
   indexing the copied enumeration record to facilitate retrieval of the copied enumeration record from the second storage location.

2. The method of claim 1, wherein the enumeration record comprises data included in one or more packets associated with an enumeration of the target USB device.

3. The method of claim 1, wherein the buffer comprises a circular buffer.

4. An analysis system, comprising:
   a memory configured to store a buffer configured to store USB data associated with a target USB device; and
   a processor coupled to the memory and configured to:
      copy an enumeration record from a first storage location in the buffer to a second storage location not in the buffer, based at least in part on an indication that the enumeration record as stored in the buffer may be overwritten;
      use the enumeration record as stored in the second location to perform USB class level decoding of a set of USB data associated with the target device; and
      index the copied enumeration record to facilitate retrieval of the copied enumeration record from the second storage location.

5. The analysis system of claim 4, wherein the enumeration record comprises data included in one or more packets associated with an enumeration of the target USB device.

6. The analysis system of claim 4, wherein the buffer comprises a circular buffer.

7. A method of displaying USB data, comprising:
   grouping packets of a first type for visual display in a group entry displayed in a display location that allows a set of one or more class level records associated with a USB class level operation to be displayed contiguously without an intervening representation of one or more packets of the first type intervening, even if one or more packets of the first type were interspersed chronologically on a monitored bus with packets comprising the class level operation, when in a first display mode;
   grouping said packets of the first type for display, differently than in the first display mode if required, in one or more group entries displayed in one or more display locations that allow a set of one or more transaction level records to be displayed without an intervening representation of one or more packets of the first type intervening between two or more records comprising a transaction, even if one or more packets of the first type were interspersed chronologically on a monitored bus with packets comprising the transaction, when in a second display mode; and
   accumulating packets of the first type as received in real-time pending completion of the USB class level operation, when in the first display mode, and displaying the group entry once the USB class level operation is completed.

8. The method of claim 7, further comprising receiving a user input to change from the first display mode to the second display mode.

9. The method of claim 8, further comprising grouping packets of the first type so that for each of one or more transactions packets of the first type that arrived subsequent to an immediately previous transaction and prior to complete of the present transaction are represented in a single group entry displayed immediately prior to a first transaction record associated with the transaction.

10. The method of claim 7, wherein packets of the first type comprise start of frame (SOF) packets.

11. The method of claim 7, further comprising displaying the set of one or more class level records in a location adjacent and subsequent to the group entry.

12. An analysis system, comprising:
a display device; and
a processor coupled to the display device and configured to:
group packets of a first type for visual display in a group entry displayed on the display device in a display location that allows a set of one or more class level records associated with a USB class level operation to be displayed contiguously on the display device without an intervening representation of one or more packets of the first type intervening, even if one or more packets of the first type were interspersed chronologically on a monitored bus with packets comprising the class level operation, when in a first display mode;
group said packets of the first type for display on the display device, differently than in the first display mode if required, in one or more group entries displayed in one or more display locations that allow a set of one or more transaction level records to be displayed on the display device without an intervening representation of one or more packets of the first type intervening between two or more records comprising a transaction, even if one or more packets of the first type were interspersed chronologically on a monitored bus with packets comprising the transaction, when in a second display mode; and
accumulate packets of the first type as received in real-time pending completion of the USB class level operation, when in the first display mode, and display the group entry once the USB class level operation is completed.

13. The analysis system of claim 12, wherein the processor is further configured to receive a user input to change from the first display mode to the second display mode.

14. The analysis system of claim 13, wherein the processor is further configured to group packets of the first type so that for each of one or more transactions packets of the first type that arrived subsequent to an immediately previous transaction and prior to complete of the present transaction are represented in a single group entry displayed immediately prior to a first transaction record associated with the transaction.

15. The analysis system of claim 12, wherein packets of the first type comprise start of frame (SOF) packets.

16. The analysis system of claim 12, wherein the processor is further configured to display the set of one or more class level records in a location adjacent and subsequent to the group entry.

17. A method of analyzing USB data, comprising:
copying an enumeration record from a first storage location in a buffer configured to store USB data associated with a target USB device to a second storage location not in the buffer, based at least in part on an indication that the enumeration record as stored in the buffer may be overwritten;
using the enumeration record as stored in the second location to perform USB class level decoding of a set of USB data associated with the target device; and
tagging the enumeration record as stored in the first location with a data value indicating that the enumeration record is an enumeration record.

18. An analysis system, comprising:
a memory configured to store a buffer configured to store USB data associated with a target USB device; and
a processor coupled to the memory and configured to:
copy an enumeration record from a first storage location in the buffer to a second storage location not in the buffer, based at least in part on an indication that the enumeration record as stored in the buffer may be overwritten;
use the enumeration record as stored in the second location to perform USB class level decoding of a set of USB data associated with the target device; and
tag the enumeration record as stored in the first location with a data value indicating that the enumeration record is an enumeration record.

* * * * *